US005212624A

United States Patent [19]

Johnson et al.

[11] Patent Number: 5,212,624

[45] Date of Patent: May 18, 1993

[54] INTERLOCK MECHANISM FOR EXPLOSION-PROOF FIXTURE HAVING CIRCUIT BREAKER SWITCH

[75] Inventors: James G. Johnson, Merrillville, Ind.; Nabil L. Mina, Roselle, Ill.

[73] Assignee: Appleton Electric Company, Chicago, Ill.

[21] Appl. No.: 832,962

[22] Filed: Feb. 7, 1992

[51] Int. Cl.⁵ .......................... H02B 1/10; H01H 9/20

[52] U.S. Cl. ................................ 361/357; 200/43.02; 200/50 B; 200/51 R

[58] Field of Search ........................ 174/50, 50.5, 52.1; 439/79, 271, 276; 361/331, 334, 356, 357, 392; 200/51 R, 51.09, 50 B, 43.02, 297, 306

[56] References Cited

U.S. PATENT DOCUMENTS

| | | | |
|---|---|---|---|
| 3,735,078 | 5/1973 | Appleton | 200/293 |
| 4,213,098 | 7/1980 | Piston | 200/51.12 |
| 4,335,286 | 6/1982 | Nelson | 200/50 B |
| 4,521,649 | 6/1985 | Nelson | 200/50 B |
| 4,553,000 | 11/1985 | Appleton | 200/50 B |

FOREIGN PATENT DOCUMENTS

| | | | |
|---|---|---|---|
| 1540523 | 1/1970 | Fed. Rep. of Germany | 200/50 B |
| 346933 | 4/1931 | United Kingdom | 200/50 B |

*Primary Examiner*—Gerald P. Tolin
*Attorney, Agent, or Firm*—Jones, Day, Reavis & Pogue

[57] ABSTRACT

An interlock mechanism operably associated with the plug receptacle of an explosion-proof housing whereby a plug may be inserted into or removed from the receptacle only when electrical current is not delivered to the receptacle. The interlock mechanism comprises a safety shaft for engaging a plug inserted into the receptacle, a reciprocating shaft operatively connected to a circuit breaker handle, and a locking pin for securing the safety shaft in a standby position, whereby the circuit breaker handle cannot be moved unless the safety shaft engages the plug casing, the safety shaft cannot be disengaged from the plug casing unless the circuit breaker handle has been moved to an off position, and the safety shaft will not engage the plug casing until it is released by the locking pin after the locking pin is biased to its disengaged position by the inserted plug.

15 Claims, 4 Drawing Sheets

INTERLOCK MECHANISM FOR EXPLOSION-PROOF FIXTURE HAVING CIRCUIT BREAKER SWITCH

BACKGROUND OF THE INVENTION

The present invention relates generally to explosion-proof electrical fixtures having a circuit breaker switch for energizing and deenergizing the fixture, and more specifically to an interlock device used in such a fixture in order to ensure that a plug may be inserted or removed from the fixture only when the fixture is deenergized.

Explosion-proof fixtures are used in industrial environments containing hazardous substances like dust particles and gases. An electrical device such as a power source receptacle or switch is an arcing device, and sparks produced thereby may ignite the particles or gases to cause an explosion. Therefore, such devices are commonly housed in an electrical fixture consisting of a container and cover made from heavy-gauge metal, the two halves being securely connected so that any flame arising from an explosion inside the fixture cannot propagate outside the fixture to ignite the external environment.

Because a power source contained in the fixture delivers large voltage currents, it is often advisable for purposes of safety to include a circuit breaker switch so that the power source receptacle may be deenergized before a plug is inserted or removed. However, it is foreseeable that the operator of an electrical machine might forget to turn off the circuit breaker switch before inserting or removing a plug from the fixture receptacle, thereby running the risk of experiencing an electrical shock. As a reminder, it is possible to include in the fixture design an independent, hand-operated safety shaft, which engages the plug casing, and therefore must be disengaged before the plug casing may be inserted into or removed from the socket.

It is still conceivable, however, that the operator might disengage the safety shaft and insert or remove the plug without turning off the circuit breaker switch. Therefore, the safety shaft and circuit breaker may be interconnected by suitable means so that the safety shaft cannot be disengaged before the circuit breaker is turned off. Such a device is disclosed in U.S. Pat. No. 3,735,078 issued to Appleton et al., and assigned in common to the assignee of the present invention. Basically, the safety shaft and a rod operated by the circuit breaker handle feature undercut regions in the respective shafts, creating cooperating abutment surfaces so that the safety shaft can be moved only if the circuit breaker shaft has been moved to a predetermined "off" position.

However, the undercut designs of the safety shaft and circuit breaker shaft do not prevent the safety shaft from being placed in a position without a plug inserted in the receptacle housing, such that the circuit breaker can be turned on. Therefore, a second reciprocating shaft is included in the U.S. Pat. No. 3,735,078 design, which is spring biased into interlocked engagement with the safety shaft such that it normally secures the safety shaft in a disengaged position whereby the circuit breaker is locked in the "off" position. But when a plug is inserted in the receptacle, it moves the second reciprocating shaft to a position such that an undercut therein allows the safety shaft to drop to an engaged position with the plug casing, thereby permitting the circuit breaker to be turned on. In order to remove the plug from the receptacle, the circuit breaker must be turned off and the safety shaft lifted, whereupon the spring biased second reciprocating shaft engages the safety shaft in the disengaged position once the plug is removed.

This prior art design, though, requires a second set of undercuts to be machined into the safety shaft and second reciprocating shaft. Moreover, a separate actuating means is needed to move the second reciprocating shaft, which in the U.S. Pat. No. 3,735,078 takes the form of an independent lever rod, which does not always work smoothly. Furthermore, the undercut regions of the safety shaft, circuit breaker shaft, and second reciprocating rod must be machined so that the three shafts can meet in precise, cooperative alignment, or else the device will not work properly.

SUMMARY OF THE INVENTION

Accordingly, it is an object of the present invention to provide an explosion-proof housing having a circuit breaker switch engaged by a safety blocking device such that the circuit breaker must be turned off before a plug may be inserted or removed from a receptacle portion of the explosion-proof housing.

Another object of the present invention is to provide such a safety blocking device, which is easy to machine.

Yet another object of the present invention is to provide such a safety blocking device which cooperates with the circuit breaker switch without requiring a plurality of interlocking, precisely aligned shafts.

Still another object of the present invention is to provide such a safety blocking device, which can operate with a minimum number of independent parts.

Other objects of the invention, in addition to those set forth above, will become apparent to those skilled in the art from the following disclosure.

Briefly, the invention is directed to providing an interlock mechanism operably associated with the plug receptacle of an explosion proof housing so that a plug may be inserted into or removed from the receptacle only when a circuit breaker handle has deenergized a switch delivering electrical current to the plug receptacle. The interlock mechanism comprises a safety shaft for engaging a plug inserted into the receptacle, a reciprocating shaft operatively connected to a circuit breaker handle, and a locking pin for securing the safety shaft in a standby position, whereby the circuit breaker handle cannot be moved unless the safety shaft engages the plug casing, the safety shaft cannot be disengaged from the plug casing unless the circuit breaker handle has been moved to an off position, and the safety shaft will not engage the plug casing until it is released by the locking pin after the locking pin is biased to its disengaged position by the inserted plug.

DETAILED DESCRIPTION OF THE PREFERRED EMBODIMENT

Figure 1:
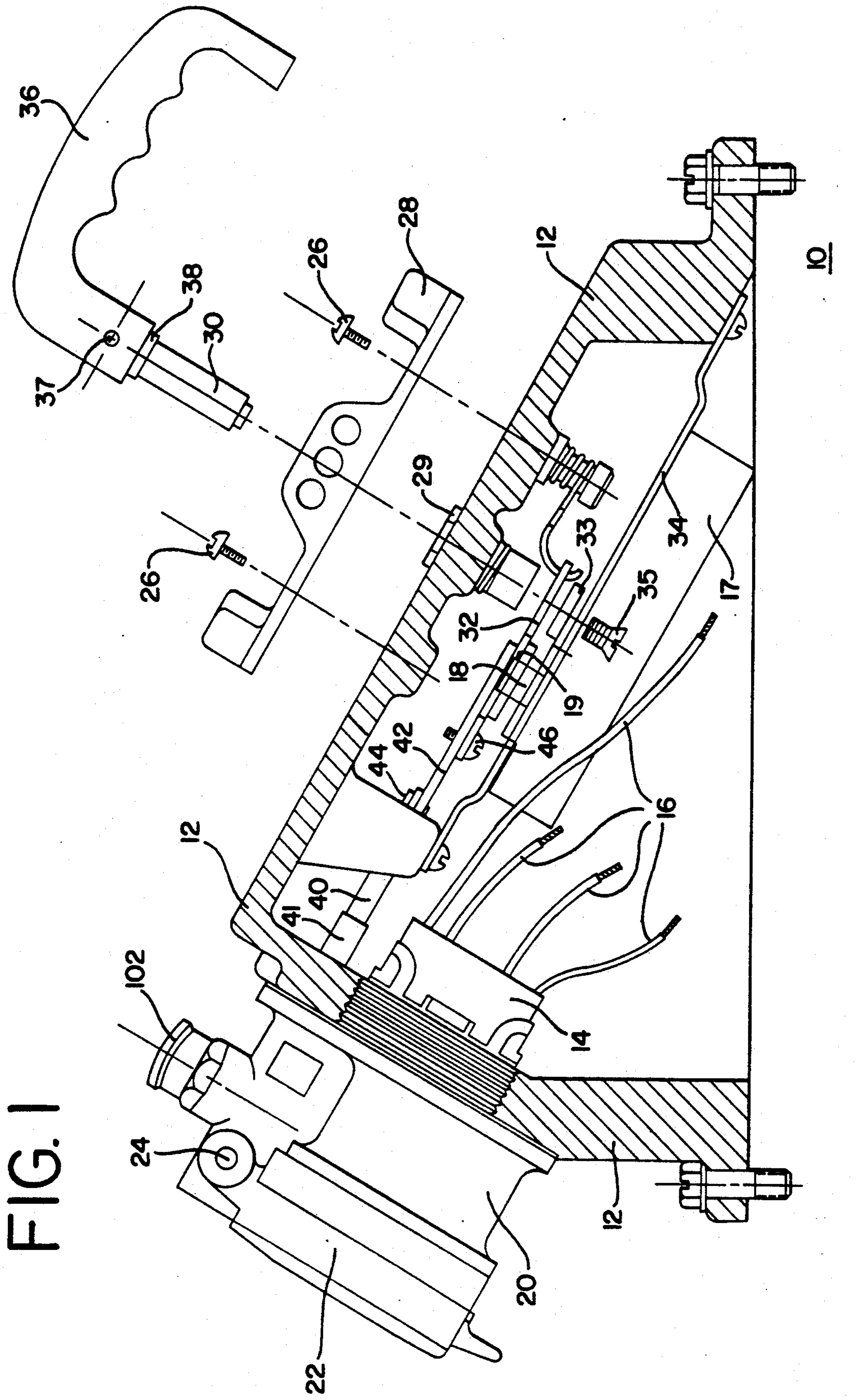
FIG. 1 shows a partially cut-away side view of the explosion-proof circuit breaker switch of the present invention.

FIG. 1 of the drawings illustrates a portion of the explosion-proof fixture 10 of the present invention, including housing 12 made of a suitable rigid cast metal. Located at one end of housing 12 is plug receptacle 14, which is ultimately by means of wires 16 to a power source (not shown). Interposed within the wires 16 connecting receptacle 14 and the power source is a conventional switch mechanism 17 (not shown), which delivers or interrupts delivery of electrical current to the receptacle. Switch 17 has a toggle 18, which is manually activated to turn the switch "on" or "off."

Mounted to the explosion-proof housing 12 is plug housing 20, which provides a suitable cavity for a plug which is inserted into receptacle 14. Cover 22 is pivotably mounted to plug housing 20 by means of pin 24, and is spring biased into a closed position when a plug is not inserted into the receptacle in order to keep dust particles or human hands from coming into contact with the receptacle.

Mounted on another face of explosion-proof housing by means of screws 26 is lock stop bracket 28. A hole in the face of the lock stop bracket fits around shaft bushing 29, which, in turn, passes through the wall of explosion-proof housing 12. Breaker actuator shaft 30 is interposed through lock stop bracket 28, shaft bushing 29, and a hole in breaker actuator 32, and finally is pivotably secured to mounting plate 34 by means of screw 35 and clamp washer 33. The other end of actuator shaft 30 is connected to circuit breaker handle 36 by means of roll pin 37 and retaining ring 38. Extension shaft 40, in turn, is connected to breaker actuator 32 by means of actuator link 42, polarizing rivet 44 and screw 46. Rotational force imparted to actuator shaft 30 by means of circuit breaker handle 36 is thereby translated into linearly directed force upon extension shaft 40 by means of the geometry of breaker actuator 32 and actuator link 42, as is commonly known in the art. Toggle 18 of switch 17 intrudes through a hole 19 located in breaker actuator 32. Thus, if circuit breaker handle 36 is rotated to the "on" position, extension shaft 40 is consequently moved in a direction away from plug housing 20, moving toggle 18 to the "on" position to complete an electrical circuit between receptacle 14 and the power source. Once handle 36 is returned to its "off" position, however, shaft 40 moves back toward housing 20, thereby returning toggle 18 to the "off" position.

Figure 2:
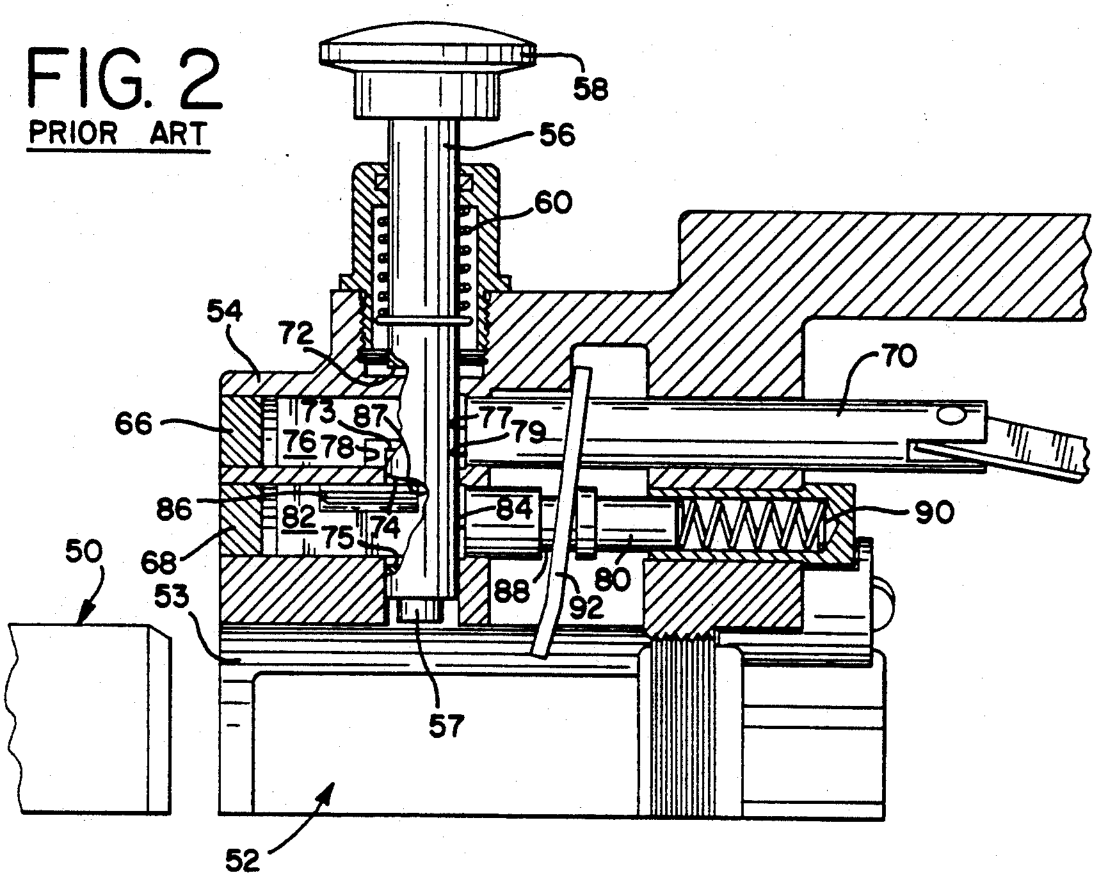
FIG. 2 PRIOR ART
FIGS. 2 and 3 show an interlock mechanism of the prior art for the circuit breaker switch.
Figure 3:
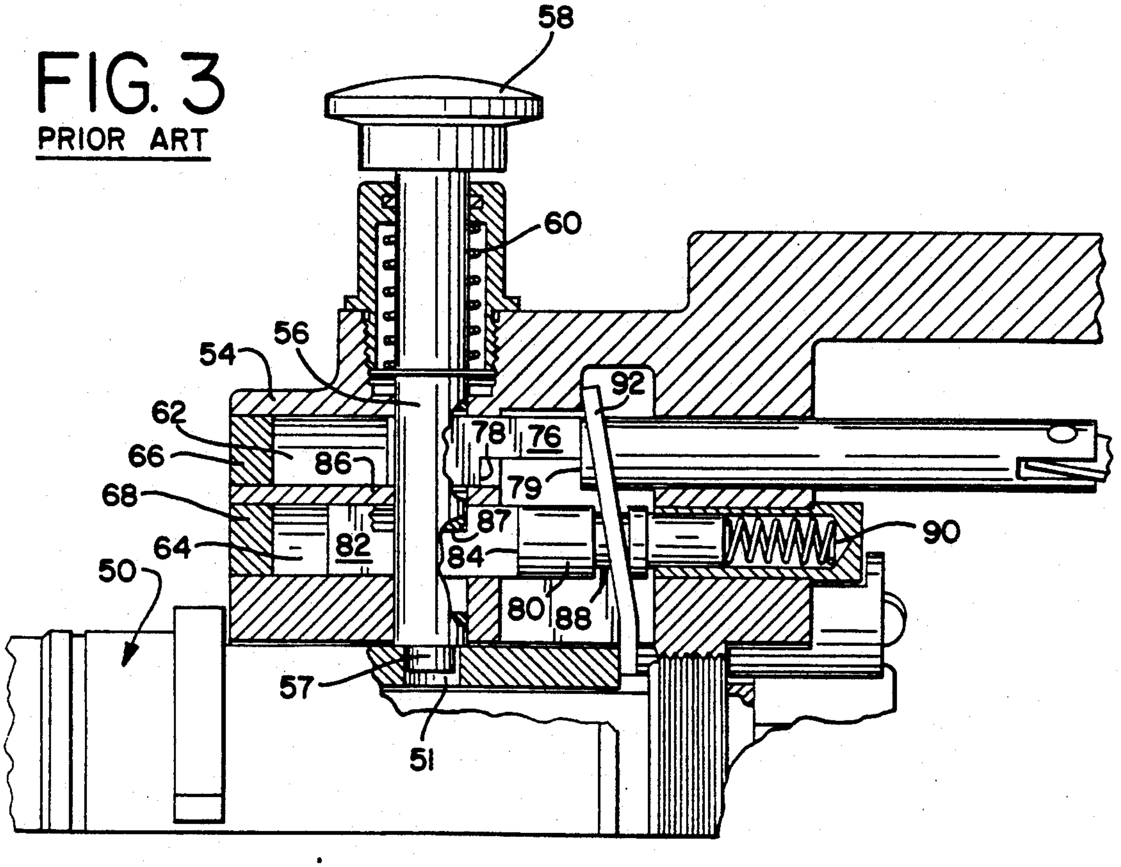
FIG. 3 PRIOR ART

FIGS. 2 and 3 illustrate a circuit breaker interlock mechanism of the prior art, which is more fully described in assignee's previously issued U.S. Pat. No. 3,735,078. In general, plug 50 is received in plug receptacle 52 (see FIG. 3). Located in plug housing 54, and in a normal direction to the longitudinal axis of plug 50, is safety shaft 56 having handle 58. When the plug is completely inserted in the receptacle so that electrical contact is made, cavity 51 in the plug is aligned with tip 57 of safety shaft 56. Spring 60 biases the safety shaft and tip into engagement with the cavity, so that plug 50 may not be removed until handle 58 is lifted.

Plug housing 54 also contains two longitudinal bores 62 and 64, which are normal to and slightly offset from the axis of safety shaft 56. Caps 66, 68 plug the ends of bores 62, 64 to create closed channels. Interposed inside channel 62 is first reciprocating shaft 70, while second reciprocating shaft 80 is contained in channel 64.

Safety shaft 56 has two slots on one side thereof, with the slots being normal to the axis of the shaft. The first slot defines abutments 72 and 73, while the second slot defines abutments 74 and 75. First and second reciprocating shafts 70 and 80, respectively, are mounted in plug housing 54 so that their longitudinal axes are positioned behind the longitudinal axis of safety shaft 56.

One side of first reciprocating shaft 70 has been cut away to create a flat region 76 with on abutment 77. Normal to flat region 76 is a slot defining abutments 78 and 79. Likewise, a portion of second reciprocating shaft 80 has been removed to define flat region 82 and abutment 84. Normal to flat region 82 is a slot defining abutments 86 and 87. Positioned between the opposite end of second reciprocating shaft 80 and plug housing 54 is spring 90, which biases the shaft in a direction towards safety shaft 56. Intermediate the ends of second reciprocating shaft 80 is an annular groove 88. A bifurcated actuator 92 extends into groove 88 with one end bearing on plug housing 54 and the other end extending into opening 53 in plug receptacle 52 to contact plug 50 as it is moved into the receptacle.

The circuit breaker is in the "off" position in FIG. 2, and first reciprocating shaft 70 is positioned toward the left end of channel 62. At the same time, spring 90 biases second reciprocating shaft 80 to the left end of channel 64. Abutment 74 on safety shaft 56 contacts the side of second reciprocating shaft 80, thereby locking the safety shaft in the disengaged position. At the same time, abutments 78 and 79 on first reciprocating shaft 70 are locked by safety shaft 56, thereby preventing the circuit breaker from being turned to the "on" position.

Should plug 50 be inserted into receptacle 52, as shown in FIG. 3, however, the forward end of the plug pushes the lower end of bifurcated actuator 92 to the right, which, in turn, moves second reciprocating shaft 80 to the right to compress spring 90. In this position, safety shaft 56 can drop into the slot defining abutments 86 and 87 in second reciprocating shaft 80, thereby causing tip 57 of safety shaft 56 to engage cavity 51, thereby locking plug 50 into receptacle 52. At the same time, first reciprocating shaft 70 may freely pass between abutments 72 and 73 of safety shaft 56, thereby allowing the circuit breaker to be turned to the "on" position. In order to remove the plug, the circuit breaker is turned off, handle 58 and safety shaft 56 are lifted, and spring 90 biases second reciprocating shaft 80 to lock the safety shaft in the disengaged position.

Figure 4:
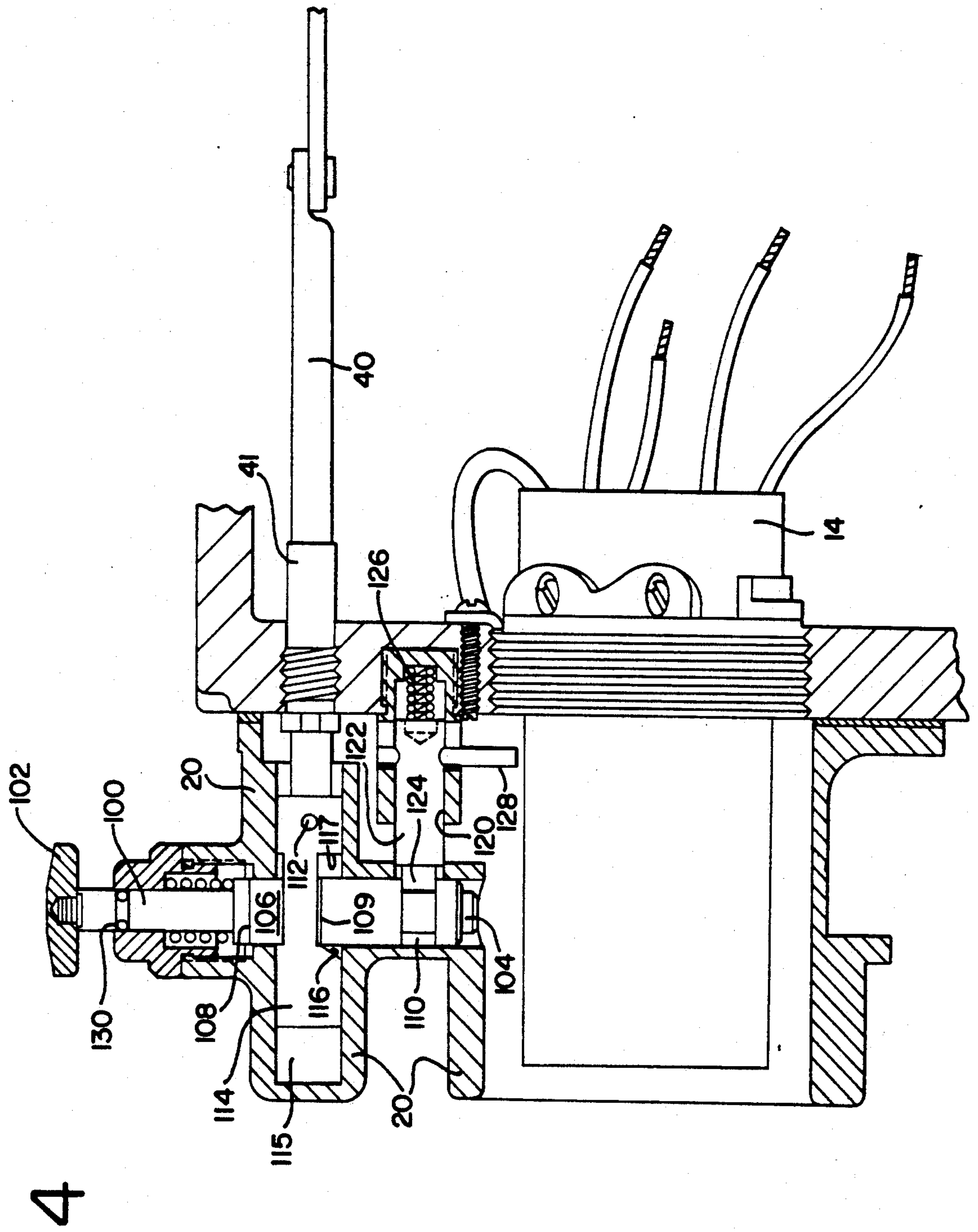
FIG. 4 shows the interlock mechanism of the present invention for the circuit breaker switch in an activated position.

The present invention is particularly directed to improvements in the interlock mechanism of the prior art. FIG. 4 shows a sectional view of the plug housing portion of FIG. 1. Safety shaft 100 has a handle 102 at one end and tip 104 at the other end. Cut into the side of the safety shaft 100 is flat region 106, defining abutments 108 and 109. Located along the safety shaft between the flat region 106 and tip 104 is annular groove 110.

Connected to extension shaft 40 by means of roll pin 112 is lock shaft 114, which slides in channel 115. Bushing 41 orients its movement through plug housing wall 20. The longitudinal axis of lock shaft 114 is located normal to and slightly in front of the longitudinal axis of safety shaft 100. Cut into the side of lock shaft 114 is a slot defining abutments 116 and 117.

Located elsewhere in plug housing 20 is sleeve 120. Positioned inside sleeve 120 is locking pin 122. At one end of locking pin 122 is locking tip 124. Spring 126 normally biases the tip of locking pin 122 into engagement with annular groove 110 of safety shaft 100. Connected integrally to locking pin 122, and normal to the longitudinal axis thereof, is grooved pin 128.

O-ring 130 prevents liquids or moisture from entering plug housing 20 along safety shaft 100

When the circuit breaker is turned to the "off" position, lock shaft 114 is moved to the position shown in FIG. 4. When plug 140 is inserted into the plug receptacle, its forward face contacts grooved pin 128, thereby moving locking pin 122 out of engagement with annular groove 100 of safety shaft 100 (See FIG. 5). This allows tip 104 of the safety shaft to drop into the cavity of the plug 140, preventing its removal. Because of the lower position of safety shaft 100, lock shaft 114 may now pass freely between abutments 108 and 109 of the safety shaft. Hence, the circuit breaker may be turned to the "on" position. In order to remove the plug, the circuit breaker must be turned off, handle 102 and safety shaft 100 lifted out of engagement with the plug, and the plug removed out of contact with grooved pin 128. At this point, spring 126 will bias locking pin 122 into engagement with annular groove 110 of safety shaft 100. This, in turn, prevents the circuit breaker from being turned on, since abutments 116 and 117 of locking shaft 114 are locked by safety shaft 100.

Figure 5:
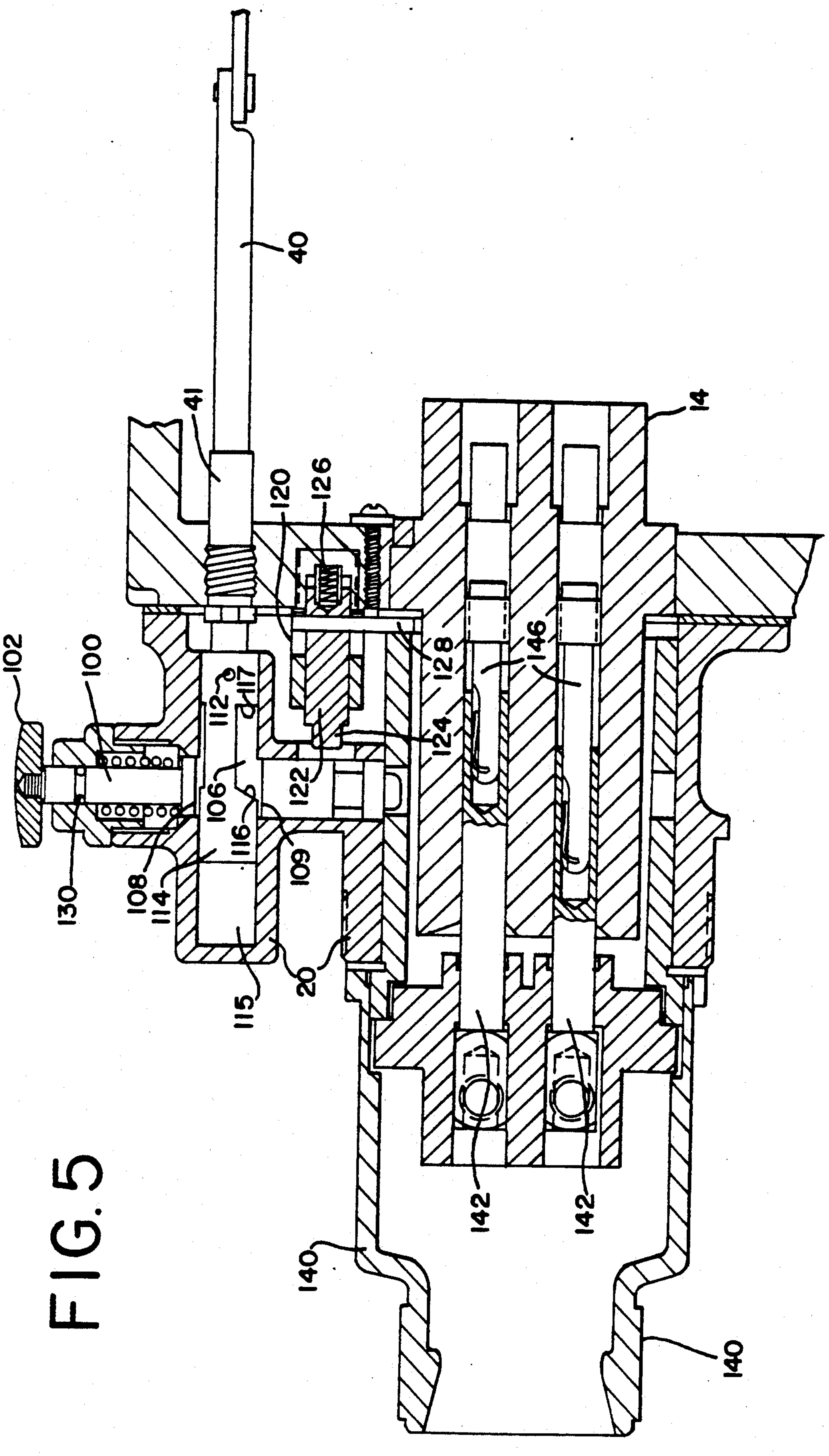
FIG. 5 shows the interlock mechanism of the present invention in a deactivated position.

FIG. 5 also shows that plug 140 bears a plurality of female terminals 142 made of a conductive metal material. Receptacle 20, on the other hand, bears a similar number of male terminals 146. When plug 140 is fully inserted into receptacle 20, as illustrated in FIG. 5, the male and female terminals 142 and 146, respectively, mate to connect an electrical circuit from the power source (not shown) to plug 140 when the circuit breaker switch is in the activated position.

From the foregoing, it will be appreciated that the interlock mechanism of the present invention operates more simply and is easier to manufacture than that of the prior art. Only safety shaft 100 and locking shaft 114 need have mating flat surfaces and locking abutments. Locking pin 122 instead simply bears tip 124 which engages an annular groove 110 on safety shaft 100. Moreover, only two shafts need be aligned for interlocked engagement instead of three. Furthermore, grooved pin 128 is integrally connected to locking pin 122, thereby causing more efficient movement of the locking pin than is possible with the separate bifurcated actuator of the prior art.

While particular embodiments of the invention have been shown and described, it should be understood that the invention is not limited thereto, since many modifications may be made. The invention is therefore contemplated to cover by the present application any and all such modifications which fall within the true spirit and scope of the basic underlying principles disclosed and claimed herein.

What is claimed is:

1. In an explosion-proof housing containing a plug receptacle for receiving a plug having a sidewall with an aperture therein, an electrical switch for completing or interrupting an electrical circuit to the plug receptacle, and switch operating means extending through the housing for actuation of the switch, an interlock means operably associated with the plug receptacle, comprising:

(a) a safety shaft mounted in the housing and aligned with the aperture in the plug sidewall for movement normal to the plug sidewall between an engaged position and a standby position;

(b) first means operatively connecting said safety shaft and the switch to prevent the switch from being moved between an energized and a deenergized position unless said safety shaft engages the plug sidewall;

(c) second means operatively connecting said safety shaft and the switch to prevent the plug from being inserted into or removed from the plug receptacle unless the switch is in the deenergized position; and (d) means operatively securing said safety shaft in the standby position until the plug is inserted into the plug receptacle, said securing means comprising a single integral part.

2. An interlock mechanism as recited in claim 1, wherein said safety shaft comprises a shaft having a handle at a first end and a tip at a second end for engaging the plug sidewall aperture.

3. An interlock mechanism as recited in claim 2, wherein said safety shaft has an annular groove thereon between the handle and the tip.

4. An interlock mechanism as recited in claim 3, wherein said securing means comprises a locking pin mounted in a sleeve in the housing normal to the longitudinal axis of said safety shaft when it is in the standby position, a spring positioned between said locking pin and the housing biasing the locking pin into engagement with the annular groove of said safety shaft, said locking pin having integral triggering means connected thereto for moving it to a disengaged position when the plug is inserted into the plug receptacle.

5. An interlock mechanism as recited in claim 4, wherein said triggering means comprises a flange integrally connected to the side of said locking pin normal thereto so that the forward face of the inserted plug engages said flange, thereby biasing said locking pin into the disengaged position.

6. An interlock mechanism as recited in claim 4, wherein said locking pin further comprises a tip for engaging the annular groove of said safety shaft.

7. An interlock mechanism as recited in claim 1, further comprising a reciprocating shaft having a first end and a second end mounted in a sleeve in the housing normal to the longitudinal axis of said safety shaft, said first end of said reciprocating shaft being operatively connected to the switch operating means.

8. An interlock mechanism as recited in claim 7, wherein said first operative connecting means comprises abutment means on said safety shaft for blocking movement of said reciprocating shaft when said safety shaft is in the standby position, said abutment means being moved out of blocking position when said safety shaft is moved to the engaged position.

9. An interlock mechanism as recited in claim 7, wherein said second operative connecting means comprises abutment means on said reciprocating shaft blocking movement of said safety shaft when the switch is in the energized position, said abutment means being moved out of blocking position when the switch is in the deenergized position.

10. In an explosion-proof housing containing a plug receptacle for receiving a plug having a sidewall with an aperture therein, an electrical switch for completing or interrupting an electrical circuit to the plug receptacle, and switch operating means extending through the housing for actuation of the switch, an interlock means operably associated with the plug receptacle, comprising:

(a) a safety shaft mounted in the housing and aligned with the aperture in the plug sidewall for movement normal to the plug sidewall between an engaged position and a standby position, said safety shaft comprising a shaft having a handle at a first end, a tip at a second end for engaging the plug sidewall aperture, and an annular groove thereon between the handle and the tip;

(b) first means operatively connecting said safety shaft and the switch to prevent the switch from being moved between an energized position and a deenergized position unless said safety shaft engages the plug sidewall;

(c) second means operatively connecting said safety shaft and the switch to prevent the plug from being inserted into or removed from the plug receptacle unless the switch is in the deenergized position; and (d) a locking pin for securing said safety shaft in the standby position until the plug is inserted into the plug receptacle, said locking pin being mounted in a sleeve in the housing normal to the longitudinal axis of said safety shaft and aligned with the annular groove of said safety shaft when it is in the standby position, a spring positioned between said locking pin and the housing biasing the locking pin into engagement with the annular groove of said safety shaft, said locking pin having integral triggering means connected thereto for moving it to a disengaged position when the plug is inserted into the plug receptacle.

11. An interlock mechanism as recited in claim 10, wherein said triggering means comprises a flange integrally connected to the side of said locking pin normal thereto so that the forward face of the inserted plug engages said flange, thereby biasing said locking pin into the disengaged position.

12. An interlock mechanism as recited in claim 10, wherein said locking pin further comprises a tip for engaging the annular groove of said safety shaft.

13. An interlock mechanism as recited in claim 10, further comprising a reciprocating shaft having a first end and a second end mounted in a sleeve in the housing normal to the longitudinal axis of said safety shaft, said first end of said reciprocating shaft being operatively connected to the switch operating means.

14. An interlock mechanism as recited in claim 13, wherein said first operative connecting means comprises abutment means on said safety shaft for blocking movement of said reciprocating shaft when said safety shaft is in the standby position, said abutment means being moved out of blocking position when said safety shaft is moved to the engaged position.

15. An interlock mechanism as recited in claim 13, wherein said second operative connecting means comprises abutment means on said reciprocating shaft blocking movement of said safety shaft when the switch is in the energized position, said abutment means being moved out of blocking position when the switch is in the deenergized position.

* * * * *